May 4, 1954
R. E. BOYDEN ET AL
2,677,499
CREDIT BALANCE MECHANISM
Filed March 25, 1950
7 Sheets-Sheet 1
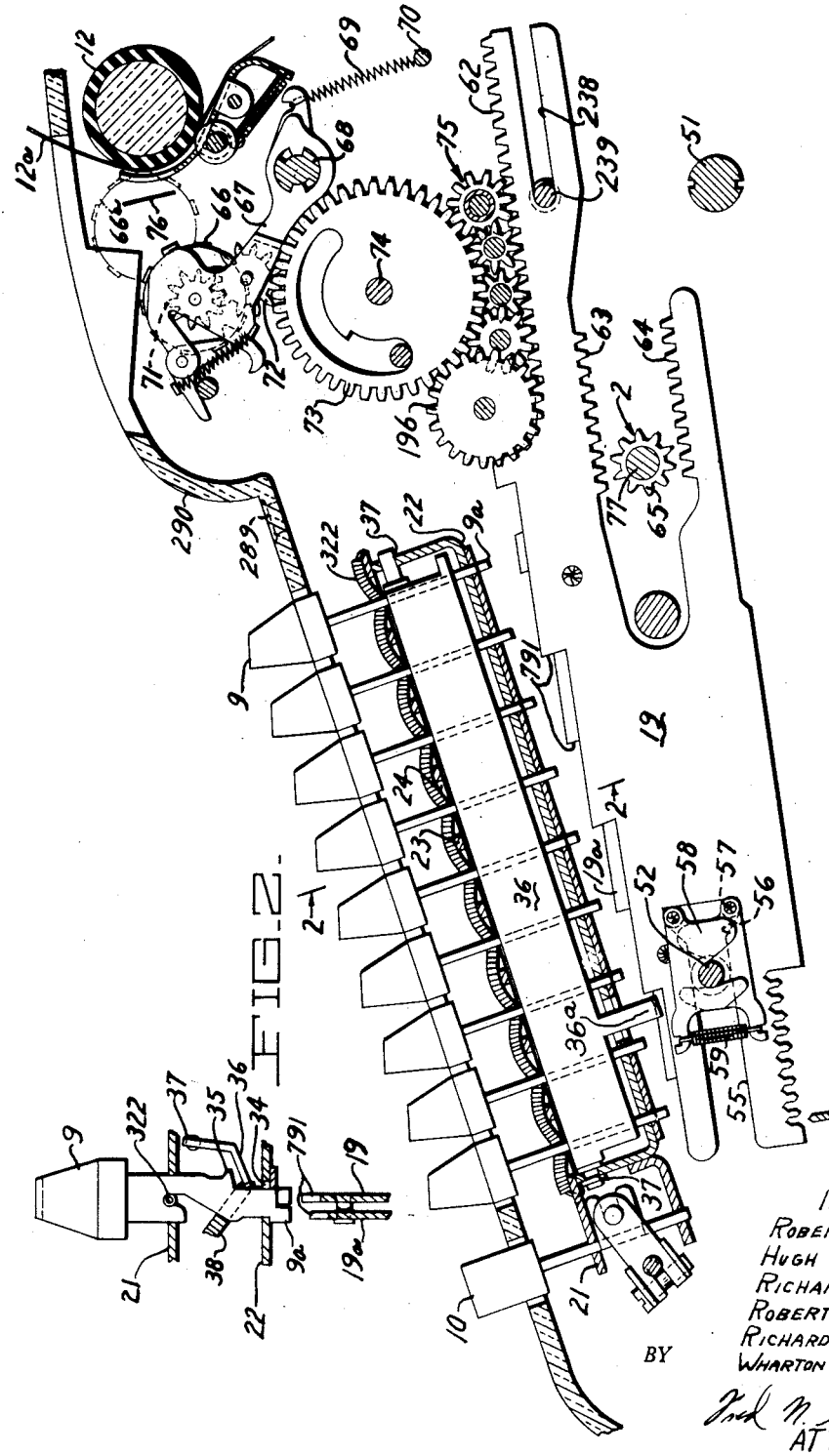
INVENTORS.
ROBERT E. BOYDEN
HUGH L. CLARY
RICHARD E. EAKIN
ROBERT D. GLENNIE
RICHARD S. MARK
WHARTON A. PARSONS
BY
ATTORNEY

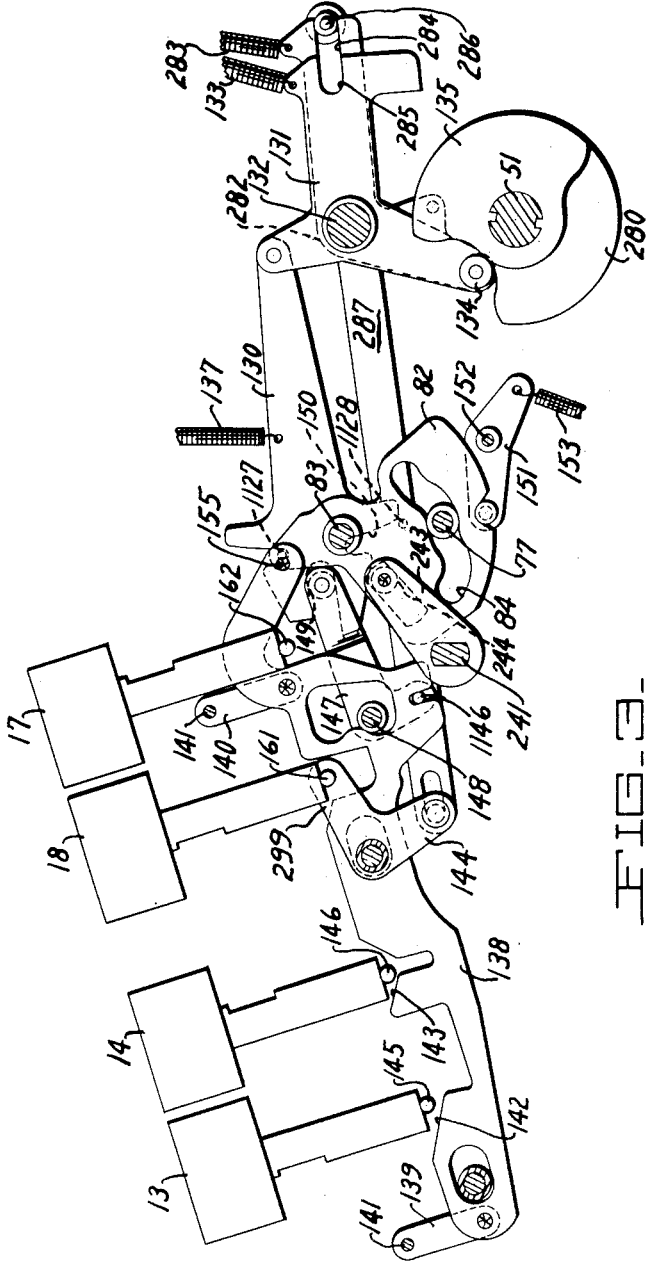

INVENTORS.
ROBERT E. BOYDEN
HUGH L. CLARY
RICHARD E EAKIN
ROBERT D. GLENNIE
RICHARD S. MARK
WHARTON A. PARSONS
BY
ATTORNEY

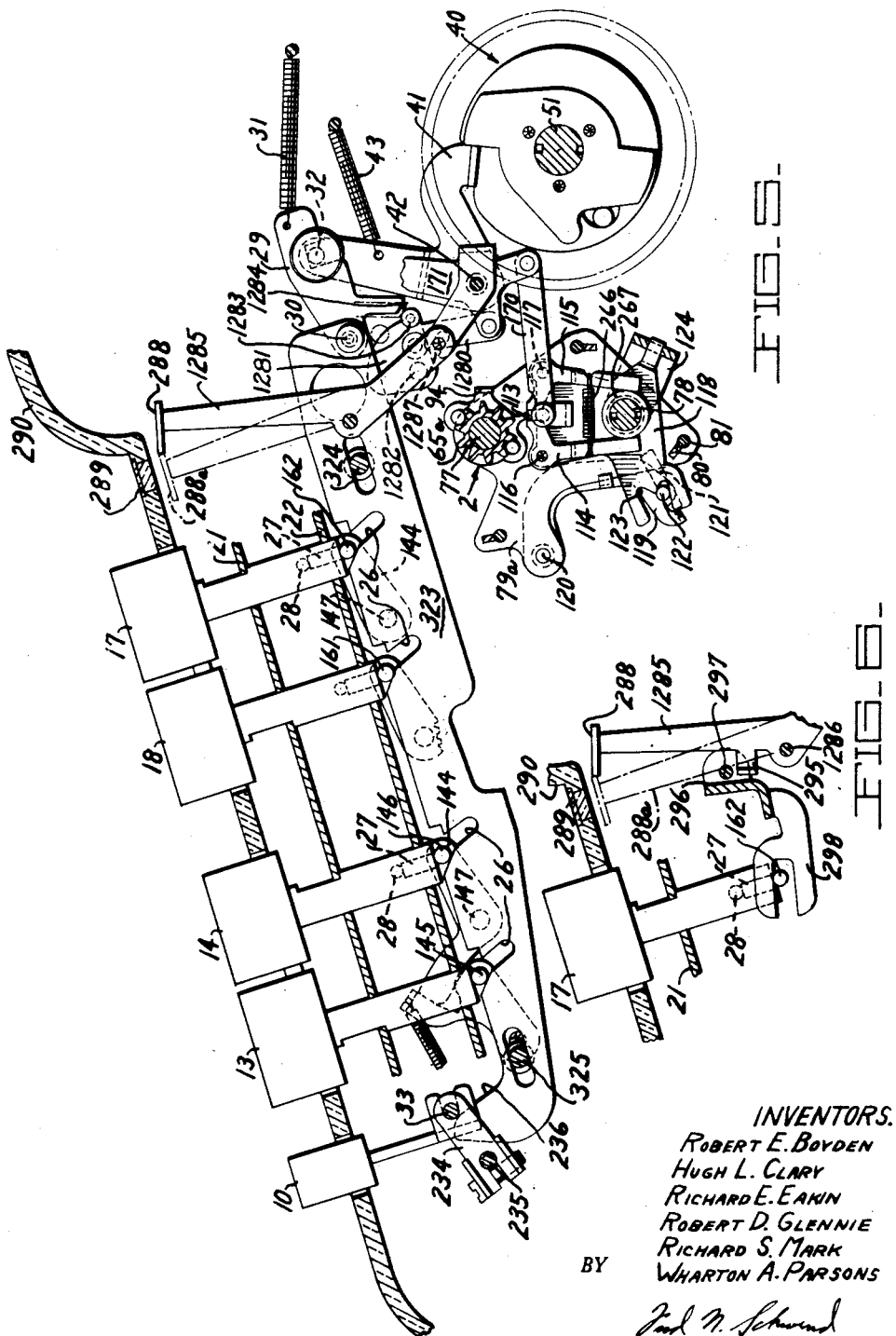

May 4, 1954
R. E. BOYDEN ET AL
2,677,499
CREDIT BALANCE MECHANISM
Filed March 25, 1950
7 Sheets-Sheet 5
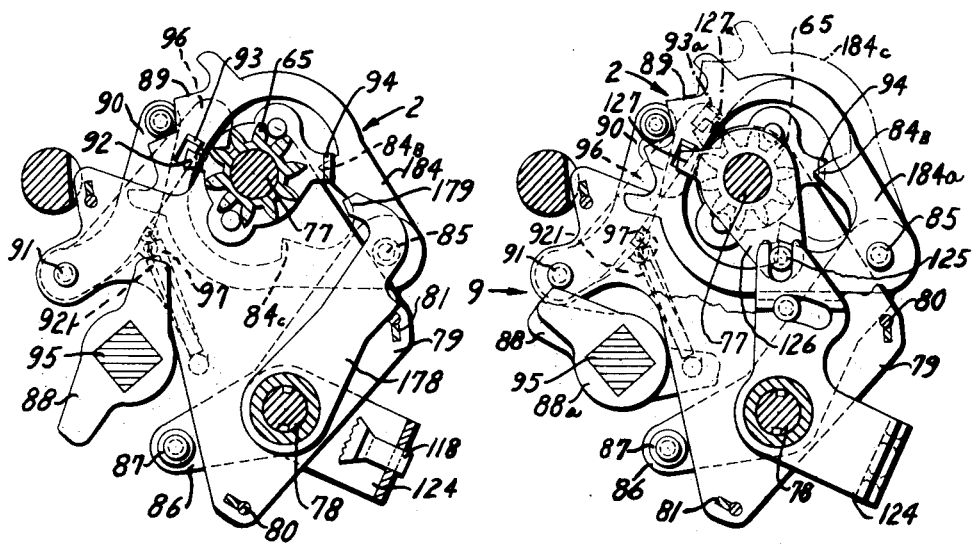
FIG. 7.    FIG. 8.
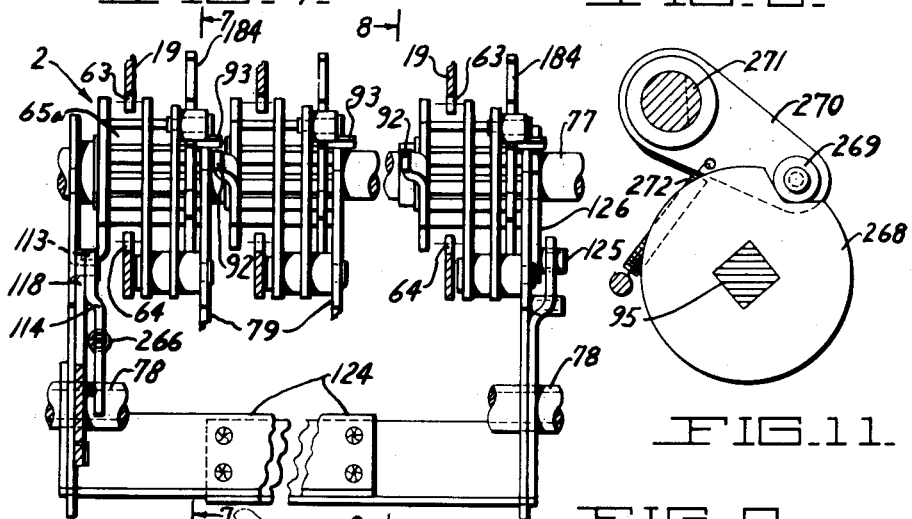
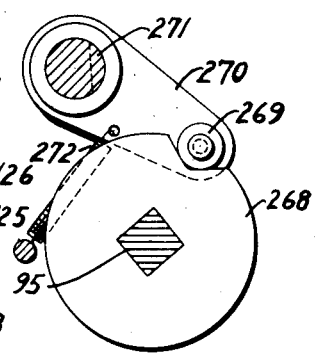
FIG. 11.
FIG. 9.
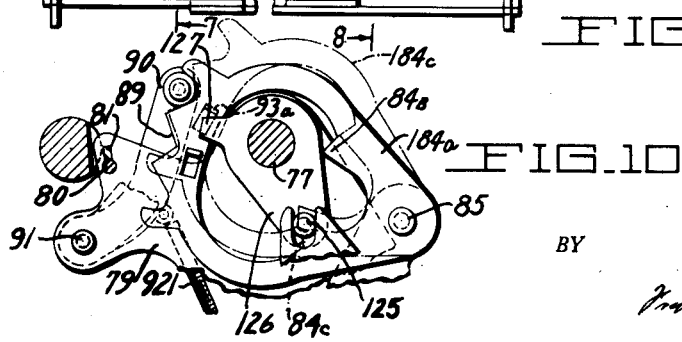
FIG. 10.
INVENTORS.
ROBERT E. BOYDEN
HUGH L. CLARY
RICHARD E. EAKIN
ROBERT D. GLENNIE
RICHARD S. MARK
WHARTON A. PARSONS
BY
Fred N. Schwend
ATTORNEY May 4, 1954   R. E. BOYDEN ET AL   2,677,499
CREDIT BALANCE MECHANISM
Filed March 25, 1950   7 Sheets-Sheet 6
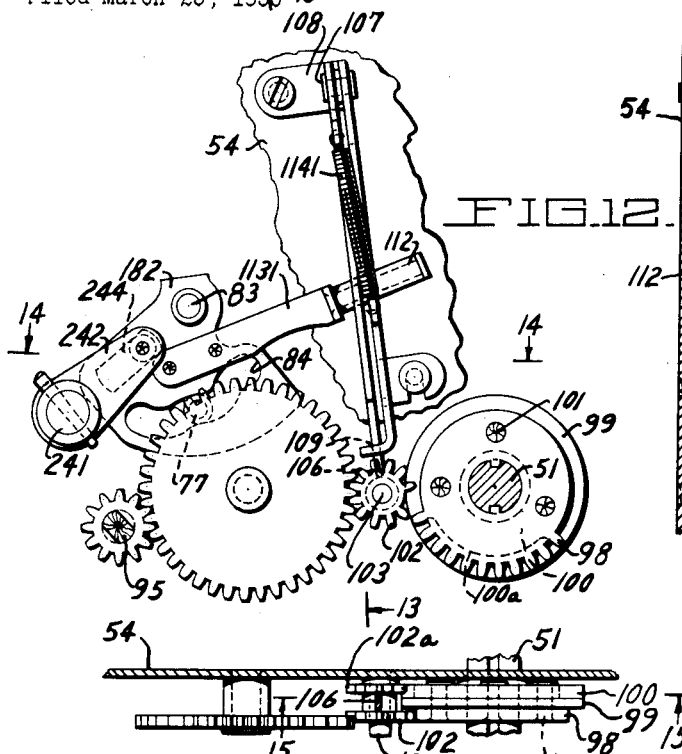
FIG.12.
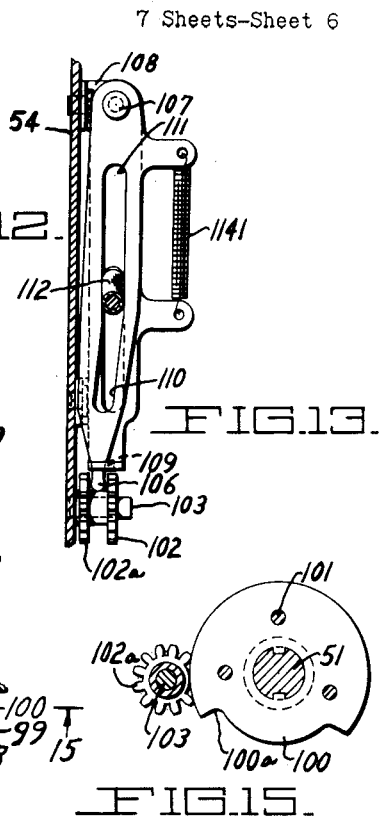
FIG.13.
FIG.14.   FIG.15.
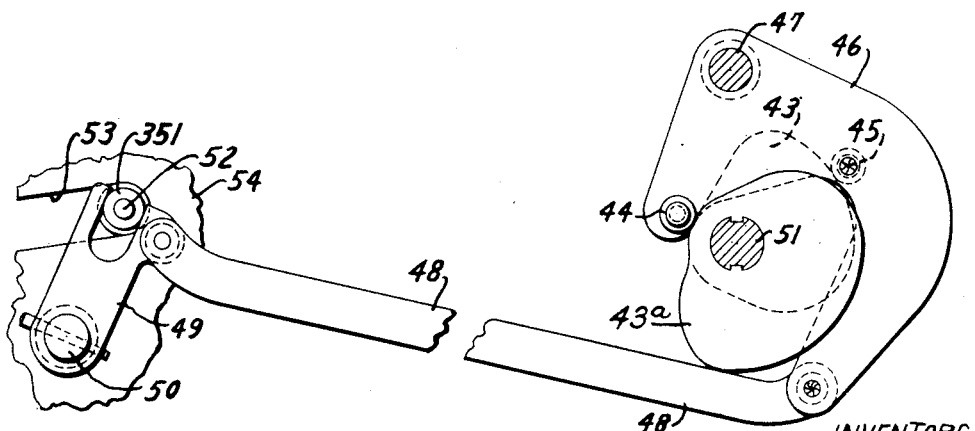
FIG.16.
INVENTORS.
ROBERT E. BOYDEN
HUGH L. CLARY
RICHARD E. EAKIN
ROBERT D. GLENNIE
RICHARD S. MARK
WHARTON A. PARSONS
BY
*Fred N. Schmid*
ATTORNEY

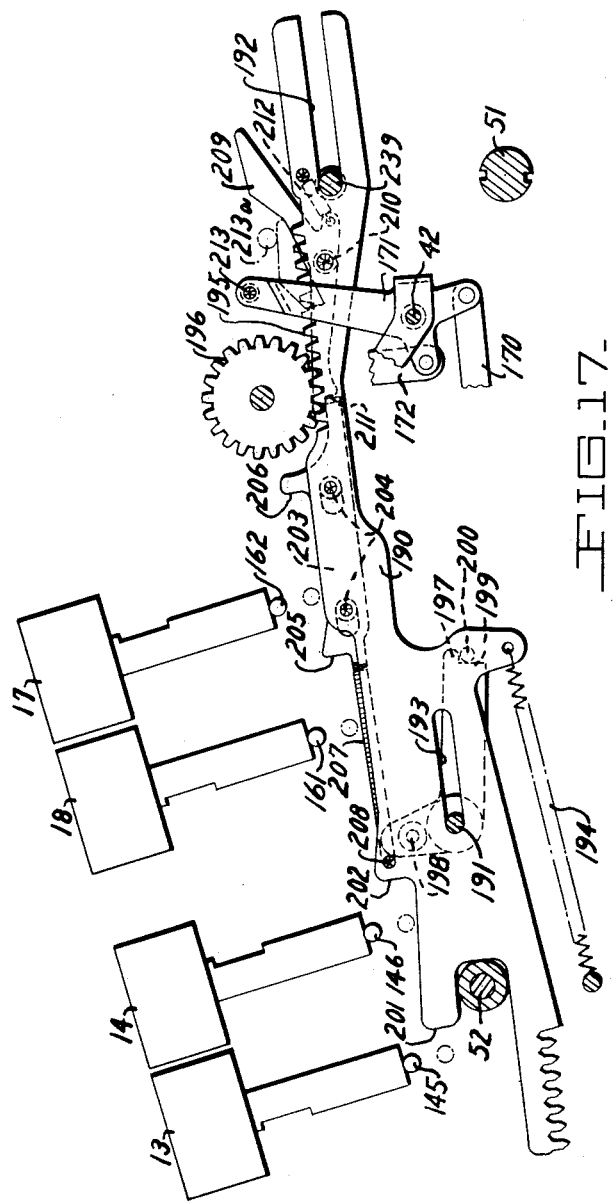

Patented May 4, 1954

2,677,499

UNITED STATES PATENT OFFICE 2,677,499

CREDIT BALANCE MECHANISM

Robert E. Boyden, Los Angeles, Hugh L. Clary and Richard E. Eakin, San Gabriel, Robert D. Glennie, Covina, Richard S. Mark, Arcadia, and Wharton A. Parsons, Glendale, Calif., assignors to Clary Multiplier Corporation, San Gabriel, Calif., a corporation of California Application March 25, 1950, Serial No. 151,896

8 Claims. (Cl. 235—60.2)

This invention relates to adding and calculating machines and has particular reference to calculating machines of the type capable of automatically computing true negative totals as well as true positive totals.

The principal object of the present invention is to provide an improved mechanism for obtaining a true negative total or a true positive total in a single machine cycle without having to take preceding blank or other preparatory machine cycles.

Another object is to provide an entirely automatic mechanism for taking true negative totals or true positive totals, whichever is required by the condition of the machine, without any attention from the operator other than to cause operation of the usual total effecting controls.

Another object is to visually indicate an overdrafted condition of the calculating machine.

Another object is to automatically arrest operation of the machine upon occurrence of an overdraft.

Another object is to provide a credit balance control mechanism which is simple and economical to manufacture.

The manner in which the above and other objects of the invention are accomplished will be readily understood on reference to the following specification when read in conjunction with the accompanying drawings, wherein:

Fig. 1 is a longitudinal, sectional view through an adding machine embodying the present invention.

Fig. 2 is a transverse sectional view through a part of the keyboard of the machine and is taken along the line 2—2 of Fig. 1.

Figs. 3 and 4 are side elevation views of the accumulator control mechanism.

Fig. 5 is a side elevation view illustrating the clutch controls and the mechanism for indicating an overdrafted condition of the machine.

Fig. 6 is a fragmentary side elevation view showing a modified form of the invention.

Fig. 7 is a side view, in section, of the accumulator and is taken substantially along the line 7—7 of Fig. 9.

Fig. 8 is a side view, similar to Fig. 7, but illustrating the lowermost order of the accumulator and is taken substantially along the line 8—8 of Fig. 9.

Fig. 9 is a front view of the accumulator, with the tens transfer shaft deleted, and is taken substantially in the direction of the arrow 9 in Fig. 8.

Fig. 10 is a fragmentary side view of the lowermost order of the accumulator showing the same in a negative overdrafted condition.

Fig. 11 is a side view of the transfer shaft centralizer mechanism.

Fig. 12 is a side view of the tens transfer shaft drive mechanism.

Fig. 13 is a view taken along the line 13—13 of Fig. 12 showing the means for disabling the tens transfer shaft drive.

Fig. 14 is a sectional plan view taken substantially along the line 14—14 of Fig. 12.

Fig. 15 is a sectional view of the Geneva drive and is taken along the line 15—15 of Fig. 14.

Fig. 16 is a side view illustrating the rack drive mechanism.

Fig. 17 is a side elevation view of the symbol printing control mechanism.

Figure 4:
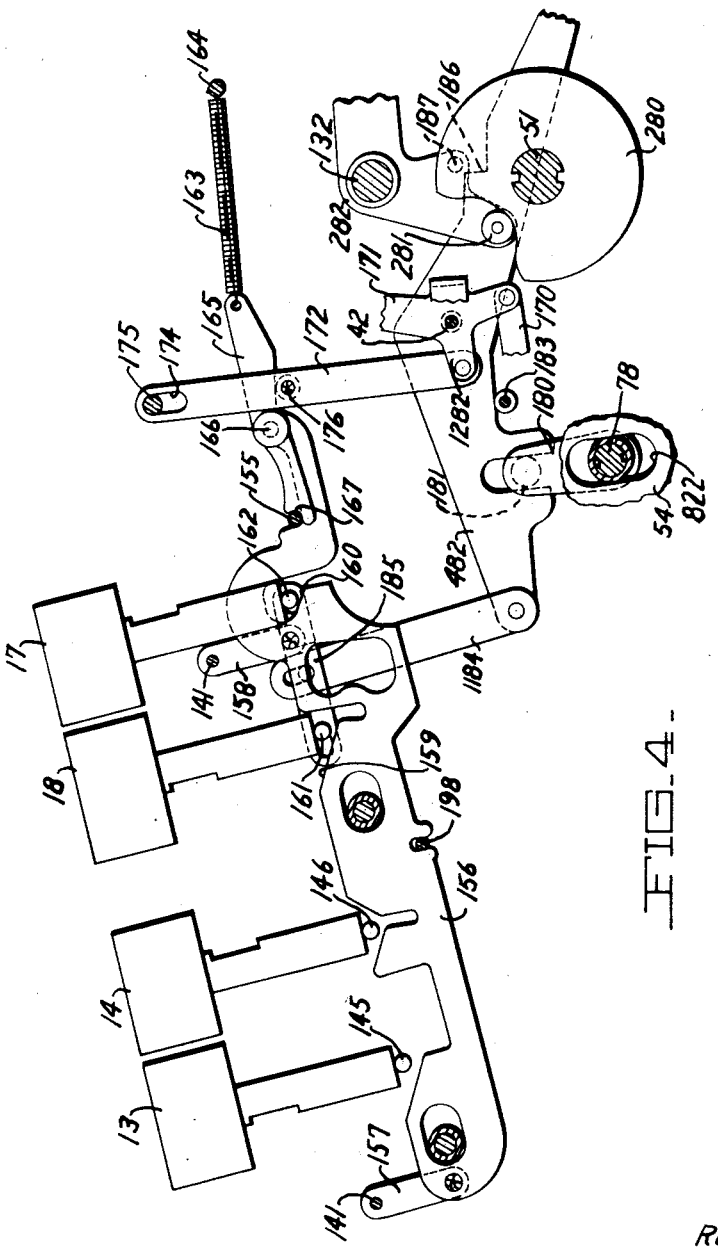

Reference is hereby made to the co-pending application of Robert E. Boyden, S. N. 582,553, filed March 13, 1945, and since matured into Pat. No. 2,583,810, issued on January 29, 1952, for a complete disclosure of the adding machine in which the present invention is embodied. Therefore, for the sake of brevity, only that mechanism which embodies the present invention or cooperates therewith will be illustrated and described in detail herein. Also, the specific form of accumulator disclosed herein is disclosed and claimed in Patent 2,472,696 issued on June 7, 1949, to E. P. Drake. It should be understood, however, that the invention may equally well be applied to other forms of adding and calculating machines and to other forms of accumulating mechanisms.

General structure and operation

In general, the machine is of the full keyboard type comprising a series of rows of amount keys, each row including nine keys 9 ranging in value from 1 to 9 for controlling entry of digits into an associated denominational order of the machine. A series of depressible control bars are provided causing the machine to perform various functions. Among these bars is an add bar 10 (Figs. 1 and 5) effective to cause operation of the machine to add amounts into an accumulator, generally indicated at 2, and also to print this amount on a paper strip 12a fed over a platen 12. A subtract bar 13 is provided to cause operation of the machine to subtract an amount set up on the keys 9 from an amount in the accumulator. A non-add bar 14, upon depression, causes operation of the machine to print an amount set up on the keyboard without entering the same in the accumulator.

When it is desired to obtain a net total of a number of items entered into the accumulator, a total bar 17 is depressed. This will cause the machine to clear the accumulator to zero and print the total. In the event it is desired to obtain a sub-total, a sub-total bar 18 is depressed, causing the machine to print the total but retain the amount in the accumulator.

Operation of the machine is divided into two phases and during the first phase of a machine cycle in adding or subtracting amounts into the machine, ordinally arranged actuating racks 19 are differentially advanced under control of depressed ones of the keys 9. During such advance, the racks drive the different orders of the accumulator 2 accordingly. At approximately mid cycle and after the racks have been differentially advanced the printing operation occurs to print the amount on the tape 12a. In totaling and sub-totaling operations the racks are also advanced during the first phase and in this case they are differentially arrested by the accumulator when the various orders thereof reach zero positions.

The accumulator employs a positively operated subsequent tens transfer mechanism and it is during the second phase of a machine cycle and during return of the racks to their original positions that this mechanism is normally operated to effect tens transfers. During credit sub-total operations of the machine, however, the operation of the tens transfer mechanism is suspended as will be seen later on.

Two successive tens transfer operations occur during the second phase of all machine cycles except credit sub-total operations. The second transfer operation normally operates idly but becomes effective upon an overdraft to enter a fugitive one into the lowermost order of the accumulator, either additively or subtractively, depending on whether an additive or subtractive overdraft occurs. Thus any tens transfers conditioned by such entry of the fugitive one are also consummated during this second transfer operation.

Means are provided for visibly and physically indicating the occurrence of an overdraft in the accumulator. A visual indicator automatically appears whenever a negative overdraft occurs and remains in appearance as long as the machine is in such condition. Also, operation of the machine is arrested whenever the machine overdrafts either positively or negatively. The latter facilitates performing division operations in that the operator may merely repeatedly subtract the divisor from the dividend until the machine stops as an incident to a negative overdraft.

Keyboard

The keyboard is of the flexible type and each amount key 9 (Figs. 1 and 2), when depressed, serves as a stop against which an associated shoulder 191 of an aligned rack 19 limits during advance of the latter.

Each of the keys 9 is guided in aligned slots formed in a keyboard frame comprising a top plate 21 and a bottom plate 22. The keys in each bank are yieldably pressed upward by a tension spring 322 extending the length of the keyboard and suitably attached at opposite ends to the top plate 21. The spring rests on cross ribs 23 formed across slots 24 in the plate 21 and extends through openings in the different keys. Upon depression of a key the adjacent portions of the spring are stretched and extend downward through the associated slot 34.

Means are provided for locking the keys 9 in their depressed positions and for releasing any depressed key. Each key stem has a cam lobe 35 which, when the key is depressed, rocks a locking bail 36 about trunnion bearings 37 on opposite ends thereof. At the bottom of its stroke, the cam lobe passes below the locking bail, enabling the latter to retract partially under the action of a spring 38 to a position where it latches the key depressed.

A stop 36a is formed on each locking bail 36, and when no key 9 in any one order is depressed, the bail 36 of that order will be spring held in an extreme inwardly rocked position in which the stop 36a lies directly in front of one of the shoulders 191 of the associated rack 19 thereby preventing any substantial forward movement of the rack during subsequent operation of the machine. However, when any amount key is latched in depressed position, the locking bail 36 will be held outward sufficiently to retain the associated stop 36a out of the path of the aligned rack. It will be noted that each rack is in two parts, 19 and 19a suitably secured together, and that the shoulders 191 are alternately arranged on the two parts. These shoulders are arranged to engage tips 9a of the key stem, which tips are arranged on alternate key stems to engage one of the rack parts.

As shown particularly in Fig. 5, the stems of the various control bars, 10, 13, 14, 17 and 18 are also slidably mounted in slots provided in the plates 21 and 22.

Rack drive

The present machine is driven by an electric motor (not shown) suitably connected to the driving side of a cyclic clutch generally indicated at 40, the driven side of which is secured to a shaft 51.

The clutch is controlled by a clutch dog 41 pivoted at 42 and normally held by a spring 43 in position to hold the clutch disengaged. Engagement of the clutch is effected by rocking the dog 41 counterclockwise.

Means are provided under control each of the control bars 10, 13, 14, 17 and 18 causing engagement of the clutch 40 and operation of the machine. As shown in Fig. 5, a clutch control bar 323 is mounted under the control bars and is provided with slots slidably guided on frame pins 324 and 325. Inclined camming slots 26 are formed in the bar 323 directly under pins 145, 146, 161, and 162 underlying and actuated by the control bars 13, 14, 17 and 18 respectively. Each of the pins is mounted on an arm 144 pivotally supported on a frame pin 147 and urged counterclockwise by a spring 27 extending between the arm and a frame stud, i. e. 28, to normally hold the associated bar in raised position. A hook 29 is pivoted at 30 to an ear of slide 323 and is normally held by a spring 31 in engagement with a pin 32 carried by the upper end of the clutch dog. Thus, depression of any of the control bars 13, 14, 17 and 18 effects a forward movement of the slide to rock the clutch dog 41 and thus cause engagement of the clutch.

The add bar 10 is likewise capable of causing engagement of the clutch through the slide 323 and for this purpose the stem of bar 10 is formed to embrace a rod 33 carried by spaced arms 234 fastened to a rock shaft 235 pivotally mounted in a manner not shown on the frame of the machine. The rod 33 is arranged in camming relation to an inclined surface 236 formed on the slide 323 whereby depression of the bar against the action of a suitable spring (not shown) will effect forward movement of the slide 323 to cause engagement of the clutch.

Means are provided for yieldably and independently transmitting a drive from the shaft 51 to the various drive racks 19. Referring to Fig. 16, a pair of juxtaposed complementary cams 43a and 43 are keyed on the shaft 51. These cams are engaged by rollers 44 and 45, respectively, mounted on a cam follower 46, pivoted at 47. The cam follower moves between the cams and is connected by a link 48 to an arm 49 secured to a rock shaft 50. The arm is bifurcated to embrace a roller 351 rotatably mounted on one end of a rack drive shaft 52. The roller is also guided for fore and aft movement within a longitudinally extending guide slot 53 in a machine side frame plate 54. A similar roller (not shown) is provided on the opposite end of the shaft 52 and is embraced by an arm similar to arm 49 fixed to the shaft 50 to insure parallel movement of the shaft 52 during its rack driving movement.

Referring to Fig. 1, each of the drive racks 19 has an elongated slot 55 embracing the shaft 52 whereby to support the forward end of the rack, the opposite end of the rack having a slot 238 slidably supported on a cross rod 239. The slot 55 in each rack terminates in opposed lateral depressions 56 at its closed end and each of these depressions is normally engaged by a roller 57 carried by drive elements 58 pivotally mounted within a groove in the shaft 52. The two drive elements 58 associated with any one rack are spring urged in opposite directions about shaft 52 by a tension spring 59 thus forming a yieldable connection between the shaft and the drive rack.

When, during forward movement of the shaft 52, a rack 19 is stopped upon striking a depressed key stem 9a or the associated zero stop 36a or by the accumulator in totaling operations as will be described later, the rollers 57 will ride out of the depressions 56 against the action of spring 59 thus breaking the connection between the shaft and the racks.

A rack gear section 62 is formed on the upper edge of each rack for the purpose of meshing with one of a series of pinion assemblies entrained with the printer mechanism as will be described later. Also, formed on each rack are a pair of opposed rack gear sections 63 and 64 disposed on opposite sides of an associated accumulator gear 65, the latter forming part of the accumulator 2.

*Printer*

The printer (Fig. 1) which will be described in general only, comprises a series of numeral printing wheels 66, one operatively connected to each of the drive racks 19 as will appear presently. Each numeral wheel has thereon a series of type ranging from 0 to 9 and these dials are so connected to the associated racks that they will print a digit corresponding to the value of the key depressed in the associated key bank or to the numerical position to which the rack is moved in its forward stroke. Each wheel is rotatably mounted on a separate lever 67 which is loosely keyed on a printer control shaft 68 and spring urged clockwise by a tension spring 69 extending between the lever and a frame stud 70. Each printer wheel has secured thereto a gear 71 normally in mesh with a gear 72 also rotatably mounted on the associated lever 67. When the lever 67 is held in its normal position as illustrated by the shaft 68 the gear 72 is meshed with an aligned one of a series of large idler gears 73 rotatably mounted on a cross shaft 74. The latter idlers are continuously entrained with respective ones of the drive racks 19 through a series of pinion assemblies generally indicated at 75, the details of which are not deemed necessary to disclose herein.

At approximately the mid-point in a machine cycle and after the racks have differentially advanced the accumulator and printer, the printer control shaft 68 is rocked clockwise by a suitable mechanism (not shown) permitting the springs 70 to rock the printer arms 67 and thus carry the printing wheels 66 forwardly into the dot-and-dash line positions 66a into contact with a printing ribbon 76 and the paper strip 12a whereby to print the number registered on the dials onto the paper. Thereafter, and before the racks are returned from their forward advanced positions the shaft 68 is rocked counterclockwise to return the levers to their illustrated positions wherein the gears 72 are remeshed with the idlers 73.

*Accumulator*

Referring in particular to Figs. 1, 5 and 7 to 10, inclusive, the accumulator generally indicated at 2 is arranged to be raised or lowered from a normal neutral illustrated position for the purpose of engaging the various accumulator gears 65 with either the upper rack sections 63 or the lower rack sections 64 of the racks 19 in accordance with the type of problem to be performed. During an additive operation the accumulator is raised to mesh the gears 65 with the rack sections 63 whereby the gears will be rotated in a counterclockwise direction during subsequent forward digitizing movements of the racks while during a subtractive operation the accumulator is lowered to mesh the accumulator gears with the rack sections 64 so that digitizing movement of the racks will drive the gears in a clockwise direction.

The accumulator comprises a shaft 77, supporting the hereinbefore mentioned accumulator gears 65, and a second shaft 78, both shafts being mounted in bearings formed in a series of cross plates 79 rigidly held in spaced relation with each other by suitable interlocking combs 80 well known in the art. A rod 81 is passed through the various plates 79 adjacent each comb to hold the latter in place. The shafts 77 and 78 are guided for vertical movement, to likewise carry the accumulator unit in vertically extending slots one of which is shown at 822 (Fig. 4) in a side frame plate 54 of the machine.

For the purpose of raising and lowering the accumulator unit in accordance with the type of problem to be performed, there is provided a box cam 82 (Fig. 3) pivoted on a frame pin 83 and having a cam groove 84 embracing a roller rotatably mounted on one end of the accumulator shaft 77. Clockwise rocking movement of the cam 82 beyond its normal central illustrated position will raise the accumulator in its adding position while counterclockwise rocking movement of the cam will lower the accumulator into subtractive position. A second cam 182 (Fig. 12) is provided to support and move the opposite end of the accumulator shaft in precisely the same manner. In order to insure parallel movement of the accumulator in its vertical travel a rock shaft 241 is rotatably supported in frame bearings (not shown) and is suitably secured at opposite ends thereof to arms 242 and 243 connected by pin and slot connections 244 to the respective cams 82 and 182.

The above noted meshing operation of the accumulator is performed in addition and subtraction operations in advance of the forward strokes of the racks 19 so that as the racks are driven forward the gears 65 will be rotated a number of increments determined by the extent of travel of the corresponding racks and since there are ten teeth in each gear each tooth advance of the gear will represent one digit entered into the particular order of the accumulator in which the gear is located.

As each gear 65 moves through one revolution or ten tooth spaces as the result of accumulating ten digits it conditions a ten transfer mechanism to subsequently enter one digit into the gear 65 of the next higher denominational order to the left. For this purpose a transfer pawl 184 is provided, being capable of rotating its associated gear an increment or one tooth space in either direction.

Each pawl surrounds its associated gear 65 and is pivoted on one side thereof at 85 to a cam follower lever 86 pivotally mounted on the lower shaft 78 of the accumulator. The lever 86 is provided with a roller 87 adapted to be engaged by an aligned one of a series of tens transfer cams 88 to be described in detail hereafter.

Each pawl 184 is provided with three detent notches 89, the central one of which is normally engaged by a centralizer lever 90, pivoted at 91 on the associated brace plate 79, and pressed against the pawl by a spring 921. In addition to holding the pawl 184 in any of three positions about pivot 85, the centralizer 90 is also effective to normally maintain the pawl in a rearward position shown in Figs. 7 and 8.

Each gear 65, as it rotates in a clockwise direction from its "zero" position illustrated in Fig. 7 to its "nine" position in a subtraction operation carries a tooth 92 integral therewith into engagement with an ear 93 on the transfer pawl 184 associated with the next higher denominational order of the accumulator. The tooth 92 thus rocks the pawl 184 upwardly about its pivotal support 85 into a position corresponding with the dot-dash line position 84a in Fig. 8. As the pawl 184 reaches its upper position it is detented therein by engagement of the centralizer 90 with the lowermost detent notch 89. In this position of the pawl the tooth 93 will be positioned clear of the transfer tooth 92 so that the gear 65 may continue its rotational movement without interference between the teeth 92 and the ear 93. Also, in this position of the pawl 184, a transfer tooth 84b thereon is located directly behind a tooth 94 of the gear 65 so that in the subsequent tens transfer phase of operation in which the cam follower arms 86 are sequentially rocked by the cams 88 to advance the pawls 184, the tooth 84b will engage and drive the gear 65 one tooth space in a clockwise or subtractive direction.

Likewise, in additive operations, and when an accumulator gear 65 rotates counterclockwise from a "nine" position to a "zero" position the tooth 92 thereof will strike the ear 93 of the transfer pawl 184 in the next higher order, moving the latter to a lowermost position similar to that illustrated in full lines in Fig. 10 in which the centralizer 90 will engage the uppermost detent notch 89 of the pawl. Since the pawl 184 is symmetrical, exactly the same action will occur as in subtractive transferring operations except that the gear 65 will be rotated one tooth in a counterclockwise or additive direction.

It will be noted that during additive, subtractive and totaling operations the accumulator will be disengaged from the racks, i. e. it will be returned to its neutral position shown in Fig. 1 prior to the transfer phase which occurs late in the machine cycle. Therefore, at the end of digitizing phase of the cycle the transfer pawls 184 in all the orders which are to receive a tens transfer will be conditioned or located in an upper or lower position depending upon the type of operation and the accumulator gears will be completely de-meshed from the racks.

Means are provided for sequentially effecting a tens transfer in the various orders of the machine beginning at the lowermost or right hand order, when viewing the machine from the front, as in Fig. 9. For this purpose, a transfer shaft 95, suitably supported in bearings carried by the side frame plates of the machine, has secured thereon the various transfer cams 88. The various cams, except the cam 88a (Fig. 8) associated with the lowermost order, have substantially diametrically opposed lobes thereon. Also, the cams are arranged in a helical row about the transfer shaft 95 so as to sequentially actuate the various pawls 184, progressing from the lowermost order on upward, the two series of cam lobes being effective to cause two successive tens transfer waves across the accumulator during each tens transfer phase. It should be noted that the lowermost order single lobed cam 88a is arranged to cause a tens transfer at the beginning of the second transfer wave, the purpose of which will be described in connection with the credit balance mechanism.

It will be noted that the centralizers 90 and the levers 86 form substantially parallel arms to carry the transfer pawls 184 through paths which closely approximate a straight line motion regardless of the angular position of each pawl about its pivot 85 as the latter is actuated by its associated cam. During an idle transfer stroke, i. e. when a pawl is not in condition for transfer, the latter will travel through its stroke without engaging its associated gear 65 but during a transfer stroke in which the pawl has been conditioned to cause a transfer, one or the other of the ears 84b and 84c of the pawl will advance the gear one increment or tooth. During such driving movement, whichever tooth of the pawl is driving the gear will be engaged by a succeeding tooth of the pinion and will be gradually shifted thereby into its neutral position so that, regardless of whether an additive or subtractive transfer is being made, the pawl will always come to rest in its neutral position.

A yieldable centralizer pawl 96 is provided to hold each accumulator gear in any registered position. As shown in Fig. 7, the pawl 96 is pivoted at the same point 91 as is the centralizer 90 and is yieldably held in engagement between two teeth of the gear 65 by a spring 97.

Means are provided for normally rotating the transfer shaft 95 during the latter part of a machine cycle and after the digitizing phase has been completed, this mechanism being disclosed in Figs. 12 to 15, inclusive. As illustrated in Fig. 12, a mutilated gear 98 and a pair of discs 99 and 100 are secured together by rivets 101 and keyed to the drive shaft 51. The gear 98 is normally aligned with and adapted to mesh with a mutilated pinion 102 rotatably and slidably mounted on a frame pin 103. Thus, gear 98 and pinion 102 form a geneva or intermittent drive mechanism. It will be noted that the pinion 102 is provided with two gear portions, the left hand portion 102a (Figs. 13 and 15) being mutilated with the mutilated section normally riding on the periphery of the disc 100. The disc 100 has a cut-out portion 100a arranged to register with the gear portion 102a when the teeth of gear 98 become meshed with the right hand portion of the pinion 102 so as to permit rotation.

The length of the toothed portion of gear 98 is such that the shaft 95 will normally be rotated one complete revolution during every machine cycle, except during credit sub-total cycles as will appear hereinafter, and by virtue of the double lobed cams 88, each of the transfer pawls, except that associated with the lowermost order, will be actuated twice during each transfer phase.

It should be noted that the shaft 95 is rotated in a clockwise direction and that the transfer cam 88 associated with the order directly above the lowermost order will be the first to effect the transfer stroke of its associated pawl 184. The cams 88 are so angularly spaced about shaft 95 that any one cam will effect a transfer stroke of its associated transfer pawl before the next adjacent higher order cam will become effective to cause its transfer pawl to move.

Means are provided for laterally shifting the pinion 102 into and out of mesh with the gear 98 so as to suspend tens transfer operations during credit sub-total operations of the machine. The pinion 102 is provided with a circumferential groove therein to receive a shifter 106 pivoted at its upper end on pin 107 carried by a bracket 108 suitably secured to the machine side frame 54. The lower end of the shifter is guided in a slot 109 provided in an ear extending from the bracket 108.

The shifter 106 is provided with a cam slot 110 registering with an elongated linear guide slot 111 in the bracket and both slots receive a roller 112 rotatably mounted on an arm 1131 secured to the aforementioned box cam 182.

It will be recalled that during add operations, the box cam 182 will be rotated clockwise from its illustrated neutral position to raise the accumulator and in so doing it will cause the roller 112 to move downward along the slots 110 and 111 and thereby cam the shifter 106 to the right in Fig. 13 so as to de-mesh the pinion 102 from the gear 98 and align the section 102a of the same over the periphery of the continuous disc 99. However, normally, except in credit sub-total operations, the box cam 182 will be returned to its neutral position before the transfer phase occurs, permitting the pinion 102 to be meshed with the gear 98 during the transfer phase. A spring 1141 extending between the shifter 106 and bracket 108 continually biases the shifter to the left in Fig. 13 to take up any lost motion intermediate the roller 112 and slots 110 and 111. In credit sub-totaling the accumulator will be held in its raised position throughout the transfer phase. Thus the tens transfer drive will be rendered ineffective during such operations.

During subtract and positive totaling and sub-totaling operations, the box cam 182 will be rotated counterclockwise to lower the accumulator into mesh with the lower rack sections 64 (Fig. 1) of the racks 19 and, consequently, the roller 112 will be raised along the slots 110 and 111. However, it will be noted that the upper portions of these slots are normally in direct alignment with each other and, therefore, the pinion 102 will remain in its position shown during such operations.

*Fugitive one mechanism*

As mentioned hereinbefore the present machine is provided with means for taking true negative totals and sub-totals and in order to properly obtain such totals provision is made for transferring a fugitive one from the highermost order of the accumulator to the lowermost order upon occurrence of an overdraft. That is, when the amount being subtracted becomes greater than that registered by the accumulator a negative overdraft will occur, and the accumulator gears in orders to the left of those being digitized will turn from "zero" to "nine" registration. This action will occur during the first transfer wave effected by the first series of cam lobes on the transfer cams 88, and upon such occurrence, the tens transfer pawl 184a (Fig. 8) associated with the lowermost order accumulator gear will be conditioned for transferring operation. Thereafter, the second transfer wave effected by the second series of cam lobes on the cams 88 will cause actuation of such lowermost order transfer pawl to enter the fugitive one in the lowermost order of the accumulator. If this entry of one requires a tens transfer into the next higher order or orders, the associated transfer pawls will be conditioned and sequentially operated during such second transfer wave.

Referring to Fig. 5, the highermost order accumulator gear 65a is provided with a special tooth 113 which, when the gear is located in zero registration, as illustrated, lies intermediate the ends of the tails of a pair of opposed by-pass pawls 114 and 115 pivotally supported at 116 and 117 respectively on a plate 118. The pawls are normally held in their illustrated positions by a tension spring 266 extending between tails thereon to hold the tails against a collar 267 on the shaft 78.

Plate 118 is pivotally supported on the shaft 78 and is settable by the tooth 113 into either of two positions and held in either position by a centralizer 119 pivotally supported at 120 on the leftmost accumulator brace plate 79a. A spring 121 extending between the centralizer and the suitable portion of the accumulator frame maintains a pin 122 on the lower end of the centralizer in engagement with one or the other of two detenting notches 123 formed in the plate 118. The latter plate is suitably secured to a fugitive one entry bail 124, extending the length of the accumulator and pivotally supported at opposite ends thereof on the accumulator shaft 78 (see also Figs. 7, 8 and 9). The end of the bail 124 adjacent the lowermost order of the accumulator (Fig. 8) is bifurcated to embrace a pin 125 attached to an arm 126 freely pivoted on the accumulator shaft 77 and provided with a tooth 127 arranged to either underlie or overlie the ear 93 of the lowermost order transfer pawl 184a.

When the accumulator is in a positive condition, the plate 118, bail 124 and arm 126 are in their positions illustrated in Fig. 8 with the tooth 127 underlying the ear 93 of transfer pawl 184a. Now, when a negative overdraft occurs due to over-subtraction, the accumulator gears, including gear 65a (Fig. 5) above the highest order being digitized, will be turned clockwise from "zero" into "nine" registration during the first transfer wave in the following transfer phase. Thus, as the highermost order gear 65a moves clockwise one increment from its "zero" position shown in Fig. 5 its tooth 113 will pick up the by-pass pawl 114 to rock the plate 118 and bail 124 counterclockwise to rock arm 126 (Fig. 8) clockwise, causing its tooth 127 to raise the transfer pawl 184a into its subtract transfer condition shown in the dot-and-dash lines 184a. Thus, during the second transfer wave the lowermost order transfer pawl 184a will be moved forwardly through its actuating stroke, entering the fugitive one into the lowermost order gear. It should be noted that the plate 118, bail 124 and arm 126 will be held in their rocked positions by the centralizer 119 as long as the accumulator remains in its negative overdrafted condition. Therefore, as the actuator pawl 184a moves forwardly through its transferring stroke it will gradually move to a neutral position and upon returning the ear 93a will come to rest under the tooth 127 which at this time will be located in the dot-and-dash line position 127a.

It will be noted that the transfer cam associated with the lowermost order accumulator gear as shown in Fig. 8 is provided with a single lobe only which is so arranged as to actuate the transfer pawl 184a at the start of the second transfer wave only.

When a negative overdraft condition is corrected by adding into the accumulator an amount greater than the deficit occurring therein, all of the accumulator gears including the highermost order gear 65a (Fig. 5), above the orders being digitized will be advanced from "nine" registration to "zero" registration. Consequently, the tooth 113 will move counterclockwise from its full line position, picking up the pawl 115 to rock the plate 118, bail 124 and arm 126 back into their illustrated full line positions shown in Figs. 5 and 8. Thus, the ear 127 of arm 126 will pick up the ear 93 of transfer pawl 184a to position the pawl in its additive transfer position shown in Fig. 10. Therefore, during the second transfer wave of the tens transfer phase, the unit one will be added into the lowermost order of the accumulator. The plate 118, bail 124 and arm 126 will thereafter remain in their set positions as long as the accumulator contains a positive amount therein.

If a relatively large amount is accumulated in the accumulator, in which case the accumulator gear 65a is advanced through one or more revolutions in an additive direction, the tooth 113 will merely wipe over the pawl 114 without altering the position of the plate 118. The same will be true when subtracting relatively large amounts from the accumulator after same assumes a negative condition in which case the tooth 113 will merely wipe over pawl 115 in a clockwise direction without altering the position of the plate 118 from its negative overdraft position.

Means are provided for locating the transfer shaft 95 in a full cycle position regardless of any play which might occur in the train of gears extending between this shaft and the main drive shaft 51. Referring to Fig. 11, a centralizer disc 268 is securely fastened to the shaft 95 and is provided with a detent notch therein normally engaged by a roller 269 carried on a centralizer arm 270 pivoted at 271 and urged clockwise by spring 272 to yieldably hold the roller 269 in the notch of the disc 268.

*Accumulator controls*

As mentioned hereinbefore, the various control bars 10, 13, 14, 17 and 18 (Figs. 3, 4 and 5) are provided for controlling and effecting operation of the machine and for controlling the raising and lowering of the accumulator to mesh the accumulator gears 65 with either the upper rack sections 63 or the lower rack sections 64 of the racks 19, depending upon the type of operation to be performed. For this purpose, mechanism is provided which is under control of the different control bars and also the fugitve one control mechanism for determining and effecting the positioning of the accumulator.

In totaling and sub-totaling operations, the positioning of the accumulator is under the joint control of the bars 17—18 and the fugitive one mechanism. When amounts being totaled or sub-totaled from the accumulator are positive in nature, the accumulator is lowered into mesh with the rack sections 64 of the racks 19 so that they are returned backwardly to "zero" registrations. However, when amounts of a negative nature are being totaled or sub-totaled the accumulator is meshed with rack sections 63 so that they are all advanced forwardly to "nine" registrations.

The aforementioned box cam 82 (Fig. 3) is provided with a pair of pins 1127 and 1128 on opposite sides of pivot 83. These pins are adapted to be selectively engaged by a hook member 130 pivotally connected to a three-armed lever 131 which is pivotally mounted on a rod 132. The cam follower is urged counterclockwise by a spring 133 to press a roller 134 against a cam 135 keyed on the drive shaft 51. Cam 135 has a high portion extending substantially over one-half of its periphery whereby it will normally rock the cam follower 131 and thereby drive and hold the hook 130 rearward during approximately the first half of a machine cycle. During additive operations, or when the machine is at rest, the hook 130 is held in its raised position illustrated in Fig. 3 by a tension spring 137 in the hook and embraces the pin 1127 whereupon rotation of the shaft 51 under control of the add bar will cause a rearward movement of the hook 130 to rock the cam 82 clockwise. This action will raise the accumulator into its additive position.

For the purpose of locating the hook 130 in a lowermost subtract control position or an intermediate non-add position wherein it is ineffective to actuate either of the pins 1127 or 1128, a control bar 138 is operatively connected to the hook and is supported for longitudinal movement by a pair of parallel links 139 and 140 pivotally suspended from the frame by pins 141. The bar 138 has two inclined active camming surfaces 142 and 143 formed thereon and underlying the aforementioned pins 145 and 146 actuated by the subtract bar 13 and non-add bar 14, respectively.

The bar 138 is connected by a pin and slot connection 146 to a bell crank 147 pivoted at 148 and, in turn, coupled through a pin and slot connection 149 to the forward end of the hook 130.

The camming surfaces 142 and 143 are so arranged that, upon depression of the subtract bar 13, the control bar 138 will be moved forward its fullest extent which, through the bell crank 147, will lower the hook 130 to cause a slot 150 therein to embrace the pin 1128 on the box cam 82. Accordingly, upon subsequent rearward movement of the hook, the box cam will be rotated counterclockwise to lower the accumulator into its subtractive position.

The contour of the camming surface 143 is such that depression of the non-add bar 14 will move the hook 130 to an intermediate position wherein it will be ineffective to actuate the box cam and thus the accumulator will remain in its neutral position during the subsequent cycle.

In order to normally maintain the box cam 82 and therefore the accumulator in their neutral positions when so placed, a centralizer 151 is provided, being pivoted at 152 and urged counterclockwise by a spring 153 to force a roller thereon into a detenting depression formed on the lower periphery of the box cam.

Means are provided for moving the control bar 138 forwardly upon depression of the total and sub-total bars to effect totaling and sub-totaling operations only when such totals and sub-totals are of a positive nature. For this purpose the control bar 138 is ineffective to be actuated directly by the total and sub-total bar actuated pins 161 and 162. Instead, the bar is provided with a pin 155 (see also Fig. 4) extending directly behind the shoulder of a second control bar 156 suspended by links 157 and 158 also pivoted at 141 independently of the links 139 and 140. Inclined camming surfaces 159 and 160 on the bar 156 underlie the pins 161 and 162, respectively. The bar 156 is normally held in its rearward illustrated position by a spring 163 tensioned between a frame stud 164 and an interponent 165 pivoted at 166 to the control bar. Normally, the spring 163 holds the interponent 165 in such a position that a shoulder 167 at the forward end thereof lies directly behind the pin 155, thus coupling the bar 156 directly to the control bar 138. Therefore, depression of either the total or sub-total bars and consequent forward movement of the control bar 156 will normally, through the pin 155, carry the control bar 138 (Fig. 3) therealong to set the hook 130 in its lowermost or subtract control position.

Depression of the total and sub-total bars will, as described hereinbefore, cause operation in the machine to clear an amount from the accumulator and print the same in the case of totals or to clear an amount and print the same and thereafter re-enter this amount in the case of sub-totals. In totaling, the accumulator is held in mesh with the racks during the first half of the cycle, as noted hereinbefore, by the cam 135 (Fig. 3). However, in sub-totaling operations the accumulator is held in mesh with the racks throughout the major portion of the cycle. To this end a second cam 280 is mounted on the shaft 51 in juxtaposition with cam 135 and is provided with a high portion extending around the major portion of the periphery thereof. This cam engages a roller 281 (Fig. 4) normally in alignment with the roller 134, the roller 281 being mounted on a bell crank 282 pivoted on the rod 132 and urged counterclockwise by a spring 283. A slot 284 is formed in the bell crank 282, which slot is normally coextensive with a shorter slot 285 in the lever 131.

A pin 286 carried on a slide 287 slides within one or both of the slots 284 and 285 depending upon its position longitudinally of the machine. The link 287 is connected at its forward end to the lower end of the arm 144 associated with the sub-total bar, the latter extension 299 of which carries the aforementioned sub-total bar actuated pin 161. Normally, when the sub-total bar is in its raised position, the link 287 will be located rearwardly as illustrated whereupon the pin 286 will be located solely within the slot 284. However, upon depression of the sub-total bar the pin 286 will be moved forwardly within both slots 284 and 285. In this condition, i. e. during a sub-totaling operation, the two elements 131 and 282 will move as a unit and the cam 280 will therefore become effective to control the hook 130 and thus hold the accumulator engaged with the drive rack throughout the major portion of the cycle.

Means are provided for disabling the interponent 165 when a negative overdraft condition is existent in the accumulator so that depression of the total or sub-total bars to effect a total or sub-total operation will be ineffective to set the accumulator into its subtract condition. Control of the interponent 165 is derived from the control plate 118 (Fig. 5) which, it will be recalled, is moved counterclockwise from its illustrated position to a second position about the shaft 78 when the accumulator is set in a negative overdraft condition. For this purpose, a link 170 is pivotally connected between an arm extending from the plate 118 and a three-armed lever 171 pivoted on the hereinbefore mentioned pin 42 independently of the clutch dog 41. One arm of the lever 171 is connected to a link 172 (Fig. 4) having a slot 174 at its upper end guided over a frame stud 175. A pin 176 extending from the link underlies the interponent 165. Therefore, as the plate 118 is rocked counterclockwise, incident to a negative overdraft occurring in the accumulator, the link 172 will be raised to rock the interponent 165 counterclockwise to lower its shoulder 167 from behind the pin 155. Therefore, while in this condition, depression of either the total or sub-total bar will be ineffective to actuate the control bar 138 and the hook 130 will remain in its illustrated raised position to raise the accumulator into an additive position during the subsequent totaling or sub-totaling operations.

*Totaling stop controls*

Means are provided under the control of the total and sub-total bars 17 and 18 respectively, to arrest the accumulator gears in their zero registrations in the taking of positive totals and sub-totals or in their nine registrations during taking of negative totals and sub-totals. As shown particularly in Fig. 7, a series of totaling or zero stop levers 178 are keyed to the shaft 78 in co-operative relation with ears 94 formed integrally with the various accumulator gears 65. During totaling and sub-totaling operations, the shaft 78 is rocked counterclockwise a slight amount to position ears 179 on the arms 178 in blocking relation to the ears 94 regardless of whether the gears are rotated in an additive or subtractive direction.

The shaft 78 and totaling stop arms 178 are rocked counterclockwise by power under control of the total and sub-total bars and to accomplish this arm 180 (Fig. 4) is secured to the shaft 78 and has a pin and slot connection 181 with a floating lever 482. The latter normally rides on a stationary frame pin 183 and is pivotally connected to the lower end of a vertical link 1184. The upper end of the latter is connected to the middle of a cross link 185 connected at the opposite ends thereof to the pins 161 and 162 underlying the stems of the control bars 17 and 18.

Upon depression of either of these two control bars the links 185 and 1184 will be lowered sufficiently to rock the lever 482 about the pin 183 to position a shoulder 186 thereon in the path of the pin 187 carried by the aforementioned cam follower 282 (see also Fig. 3). Thus, as the latter is rocked clockwise at the beginning of a total or sub-total operation as explained hereinbefore, pin 187 will force the lever 482 forwardly to rock the arm 180 and shaft 78 counterclockwise against the action of a suitable spring (not shown) so as to carry all the totaling stop arms 178 into blocking relation with the ears 94 on the accumulator gears 65. Thus, as the machine continues its cycle, the racks 19 will be driven forward, rotating the gears 65 in either an additive or subtractive direction, depending upon the condition of the accumulator, until they are arrested by the stop arms 178. The racks will therefore stand in positions mechanically representing either the true positive or true negative total values thereby registering the printing mechanism to print this value.

*Example of true negative total operation*

In order to more clearly understand the function of the machine during taking of a negative total the following example is given.

Assume that the accumulator registers a positive amount of 456 therein and that the sum of 487 is subtracted therefrom. Since the amount subtracted from the accumulator is greater than the amount already contained therein, it is evident that a fugitive one will be subtracted from the lowermost order and, if a total taking operation is initiated at this point, the accumulator gears will be advanced to nines to register on the racks as true negative totals. The problem is represented as follows:

```
  456
 -487
```

000079  complementary total appearing in accumulator before transfer operation
999969  true complementary total appearing in accumulator after first transfer wave
999968  total appearing in accumulator after subtraction of fugitive one as a result of second transfer wave
    31  true negative total registered on racks and printing mechanism as result of advancing accumulator gears to nines registration.

At the completion of the digitizing phase of a subtract cycle and before the transfer phase has commenced, the accumulator will stand at 000079, with the transfer pawls 184 in the tens and hundreds orders set in subtract tens transfer condition. Thereafter, the accumulator is raised from its subtract position to neutral and the transfer phase commences, rotating the transfer shaft 95 clockwise to cause the cams 88 to actuate all transfer pawls commencing with the tens order. Therefore the transfer pawl 184 in the tens order will retract its accumulator gear to 6 and the pawl in the hundreds order will retract its gear to 9. Accordingly, the thousands order pawl will be set in transferring condition and immediately thereafter it will be actuated to retract its gear to 9. This retracting process will continue through all of the highermost orders leaving the accumulator at the end of the first transfer wave at 999969. Retraction of the highermost order gear 65a (Fig. 5) from 0 to 9 will, through the plate 118, bail 124 and arm 126, set the units order transfer pawl 184a (Fig. 8) in subtractive transfer condition before the second transfer wave occurs. A continued rotation of the transfer shaft through its second half revolution will thus actuate the units pawl, retracting its gear from 9 to 8, leaving the accumulator to register 999968.

Rocking of bail 124 will also, through the linkage 170, 171 and 172 (Figs. 4 and 5), render the interponent 165 ineffective so that, when the total bar 17 is depressed to obtain a total, actuation of the control bar 156 will be ineffective to set the hook 130 from its normal add position to its subtract position. Accordingly, the accumulator will be raised to rotate the accumulator gears additively toward their nines positions if they were not already there, at which time they will be arrested by the totaling stops 178. Thus, the units order rack will be advanced one increment from eight to nine and the tens order rack will be advanced three increments from six to nine, thus registering 31 in these orders.

*Zero level cut-off mechanism*

Means are provided for automatically arresting operation of the machine as the accumulator overdrafts in changing from a positive to a negative nature or vice versa so as to physically indicate to the operator the fact that an overdraft has occurred. For this purpose a link 1280 (Fig. 5) is connected between the three-armed lever 171 and an arm 1281 pivoted at 1282. The arm 1281 is provided with a roller 1283 positioned in a path arranged to intercept a camming foot 1284 on the aforementioned hook 29 which it will be recalled normally couples the clutch control bar 323 to the clutch dog 41. During repeated subtract or add operations the bar 323 is held slightly forward of its illustrated position and thus maintains the camming foot 1284 in the path of roller 1283. Therefore, upon an overdraft occurring, the plate 118 will be rocked in one direction or the other depending upon the nature of the overdraft and will, through the link 170 etc., likewise rock the arm 1281 causing the roller 1283 to actuate hook 29 about its pivot 30, thereby releasing the clutch dog 41 so that it may, under the action of its spring 43, disengage the clutch. If, however, it is desired to continue the repeated add or subtract operations, the operator need merely release the depressed bar, allowing the hook 29 to be again coupled with the pin 32 of clutch dog 41 and then redepress this bar to continue operations.

*Visual overdraft indicating device*

Means are provided for visually indicating the nature and amount in the accumulator, i. e., whether the amount is negative or positive. Referring to Fig. 5, indicator lever 1285 is pivoted on a frame pin 1286 and is coupled through a pin and slot connection 1287 to the three-armed lever 171, thus partaking of the movement of the latter as the plate 118 is shifted from one position to another upon the change in character of the amount in the accumulator. A visual indicator 288 is mounted on the upper end of the lever 1285 and upon overdraft from a positive to a negative condition the visual indicator moves to the position shown by the dot-and-dash lines 288a, directly below a transparent window 289 formed in the cover 290 of the machine.

*Symbol printing controls*

In order to indicate on the tape the type of factor or totals printed, an appropriate symbol is recorded along the side of each value which is the result of any operation except addition.

Referring to Fig. 17, a single symbol control rack 190 is provided. The latter is guided for fore and aft movement by shaft 239 and a frame pin 191 embraced by slots 192 and 193, respectively, formed in the rack. A spring 194 continually urges the rack forward to follow the aforementioned rack drive shaft 52 as the latter moves fore and aft of the machine.

A rack section 195 on the rack meshes with the gear 196 forming part of one of the pinion assemblies 75 (see Fig. 1) entrained with an associated printing wheel (not shown) similar to the wheels 66 but having thereon appropriate symbol characters in lieu of the usual numeral characters.

Means are provided for preventing the symbol rack 190 from advancing from its illustrated home position when an add operation is being performed, it being desired not to print a symbol during such operations. For this purpose, a latch 197 is pivoted on the frame pin 191 and is provided with a pin 198 (see also Fig. 4) extending into a slot in the clutch control bar 156. When the bar 156 is in its rearward position, as is the case when the machine is at rest or when the add bar 10 only is depressed, a shoulder 199 on the latch is located directly in front of a pin 200 on the rack 190. Therefore, since the bar 156 is not actuated during an addition operation, the latch 197 will remain in its latching position, preventing movement of the rack 190 as the rack drive shaft 52 moves forwardly. Suitable means (not shown) are provided to prevent the symbol type wheel from moving to printing position when the rack 190 remains in its home position. However, during subtract, non-add, total, and sub-total operations, the bar 156 will be actuated as noted hereinbefore and the latch 197 will consequently be rocked to allow the symbol rack 190 to follow the drive shaft 52 until arrested by the control bars, as will now appear.

Two shoulders 201 and 202 are formed on the rack 190, the former being normally spaced one increment behind the pin 145 when the latter is lowered by the subtract bar 13. The shoulder 202 is spaced two increments behind the pin 146 when the latter is lowered by depression of the non-add bar 14. These shoulders thus limit the forward movement of the rack by one or two increments depending on which of the bars 13 and 14 is depressed.

A slide 203 is mounted on rack 190 having slots therein embracing pins 204 extending from the slide. Two shoulders 205 and 206 are formed on the slide 203, the former normally being positioned three increments behind the pin 161 when the latter is lowered by the sub-total bar 18 and the shoulder 206 being located four increments behind the pin 162 when the latter is lowered by the total bar 17. A spring 207, which is considerably weaker than spring 194, is tensioned between the slide 203 and a stud 208 on the rack 190 to urge the slide into its illustrated position and a latch 209, pivoted at 210 to the rack, is provided with a shoulder 211 to normally lie directly behind the slide 203 to lock the same in this position relative to the rack.

A spring 212 extending between a stud on the rack and the latch 209 retains the latter in blocking relation to the slide 203 when the accumulator is in a positive or normal condition. However, upon an overdraft from positive to negative condition, a pin 213 on the aforementioned three-armed lever 171 will be lowered to its alternate position shown by dot-and-dash lines 213a so that were a total or sub-total operation to be effected while the accumulator registered a negative amount, a tail of latch 209 would engage the pin 213 and move about its pivot 210 to a position releasing the slide 203. Therefore, the slide, upon striking one or the other of pins 161 and 162 would yield an amount equal to two increments of movement of rack 190 thus permitting the rack to advance further than normal to indicate a credit total or credit sub-total as the case may be.

*Modified form*

In certain cases it may be desirable to omit or disconnect the credit balance feature while retaining the zero level cut-off and the visible indicator devices. In such cases the overdraft control plate 118, pawls 114 and 115 and linkage 170, 171, 280, 281 and 285 would be retained while the link 172 (Fig. 4) and bail 124 would be removed. It would then be desirable to return the visual indicator to its hidden position (Figs. 5 and 6), indicative of a positive condition of the accumulator, upon taking of totals, if the indicator had previously been set to indicate a negative condition. For this purpose, the indicator lever 285 is provided with a tab 295 (Fig. 6) lying directly behind a bail 296 pivoted at 297 and provided with a bifurcated arm 298 embracing the total bar actuated pin 162. Therefore, depression of the total bar will rock bail 296 counterclockwise and, through the tab 295, will return the indicator to its positive indicating or hidden position, if not already there.

Having thus described the invention what we desire to secure by United States Letters Patent is:

1. In a calculating machine, the combination of an accumulator including denominationally arranged reversible accumulator elements each having a positive zero position and a negative zero position, differential actuators adapted to drive said accumulator elements in additive or subtractive directions, means including a control member settable into a first position and operable to cause said actuators to drive said accumulator elements in an additive direction, said control member being settable into a second position and operable to cause said actuators to drive said accumulator elements in a subtractive direction, totaling mechanism including a depressible total bar, a zero stop device rendered effective by said total bar upon depression thereof and adapted to arrest said accumulator elements in said positive zero positions upon movement of said accumulator elements in said subtractive direction, said zero stop device being adapted to arrest said accumulator elements in said negative zero positions upon movement of said elements in said additive direction, means normally maintaining said control member in said first position thereof, means including an interponent operable by said total bar upon depression thereof for normally setting said control member in said second position, and means actuated by the accumulator element of highest denomination and responsive to a change in the character of the sum represented by said accumulator elements for rendering said interponent ineffective to set said control member and for advancing the accumulator element of lowest denomination an amount corresponding to one unit.

2. In a calculating machine, the combination of an accumulator including denominationally arranged reversible accumulator elements, each having a positive zero position and a negative zero position, differential actuators adapted to drive said accumulator elements in additive or subtractive directions, means including a control member settable into a first position and operable to relatively adjust said actuators and accumulator elements to permit driving the latter in an additive direction, said control member being settable into a second position and operable to relatively adjust said actuators and accumulator elements to permit driving the latter in a subtractive direction, totaling mechanism including a depressible total bar and a zero stop device controlled by said total bar upon depression thereof and adapted to arrest said accumulator elements in said positive zero positions upon movement of said accumulator elements in said subtractive direction, said zero stop device being adapted to arrest said accumulator elements in said negative zero positions upon movement of said accumulator elements in said additive direction, spring means for normally maintaining said control member in said first position thereof, means normally operable by said total bar upon depression thereof for setting said control member in said second position, and means controlled by the accumulator element of highest denomination and responsive to a change in the character of the sum represented by said accumulator elements for rendering said last mentioned means ineffective and for advancing the accumulator element of lowest denomination an amount corresponding to one unit.

3. In a calculating machine, the combination of an accumulator including denominationally arranged reversible accumulator elements, differential actuators adapted to drive said accumulator elements in additive or subtractive directions, means including a device movable between two positions to cause entry of one unit into the accumulator element of lowest denomination, a pair of by-pass pawls on said device, one of said pawls being engaged and positively moved by the accumulator element of highest denomination to a position out of the path of said last-mentioned accumulator element upon movement of the latter from zero to nine registration whereby to move said device from a first one of said positions to the second, and the other of said by-pass pawls being engaged and positively moved by said accumulator element of highest denomination to a position out of the path of said last-mentioned accumulator element upon movement of the latter between nine and zero registration whereby to move said device from said second position to the first.

4. In a calculating machine, the combination of an accumulator including reversible accumulator elements; drive racks therefor adapted to drive said elements in additive or subtractive directions, means for adjusting said accumulator into either of two positions from a neutral position relative to said racks to permit driving of said accumulator elements in one or the other of said directions, tens transfer mechanism operatively associated with said accumulator elements and conditioned thereby for tens transfer from one element to the next higher denominational element, means other than said elements for actuating said tens transfer mechanism, and means responsive to movement of said accumulator into one of said two positions thereof for rendering said actuating means inoperable.

5. In a calculating machine, a combination of an accumulator including reversible accumulator elements; drive racks therefor adapted to drive said accumulator elements in additive or subtractive directions, means for adjusting said accumulator into either of two positions relative to said racks to permit driving of said accumulator elements in one or the other of said directions, tens transfer mechanism operatively associated with said accumulator elements and conditioned thereby for tens transfer from one element to the next higher denominational element, means other than said elements for actuating said tens transfer mechanism including a train of intermeshed gears, and means operable by said first mentioned means upon movement of said accumulator thereby into one of said positions for de-meshing one of said gears from another.

6. In a calculating machine, the combination of an accumulator including denominationally arranged reversible accumulator elements, differential actuators adapted to drive said accumulator elements in additive or subtractive directions, drive means including a clutch for actuating said actuators, a device movable between two positions to cause disengagement of said clutch, a pair of by-pass pawls on said device, one of said pawls being engageable by the accumulator element of highest denomination upon movement of the latter from zero to nine registration to move said device from a first one of said positions to the second, and the other of said by-pass pawls being engageable by said accumulator element of highest denomination upon movement of the latter between nine and zero registration to move said device from said second position to the first.

7. In a calculating machine, the combination of an accumulator comprising reversible accumulator elements, differential actuators adapted to drive said accumulator elements in additive or subtractive directions, drive means including a clutch for operating said actuators, a device movable between two positions for entering one unit into the accumulator element of lowest denomination, a pair of by-pass pawls on said device, one of said pawls being engageable by the accumulator element of highest denomination upon movement of the latter from zero to nine registration to move said device from a first one of said positions to the second, and the other of said by-pass pawls being engageable by said accumulator element of highest denomination upon movement of the latter from nine to zero registration to move said device from said second position to the first, a depressible control bar, clutch control mechanism controlled by said depressible bar upon depression thereof for effecting engagement of said clutch, and means actuated by said device upon movement thereof for rendering said clutch control mechanism ineffective.

8. In a calculating machine, the combination of an accumulator including reversible accumulator elements; actuators therefor adapted to drive said elements in additive and subtractive directions, means for adjusting said accumulator into either of two positions from a neutral position relative to said actuators to permit driving of said accumulator elements in one or the other of said directions, tens transfer mechanism operatively associated with said accumulator elements and conditioned thereby for tens transfer from one element to the next higher denominational element, drive means other than said elements and including a power transmission mechanism for operating said tens transfer mechanism, and means operatively connected to said accumulator and responsive to movement of said accumulator into one of said two positions for operatively disconnecting said power transmission mechanism.

References Cited in the file of this patent

UNITED STATES PATENTS

| Number | Name | Date |
|---|---|---|
| 1,774,289 | Pasinski | Aug. 26, 1930 |
| 1,839,211 | Foothorap | Jan. 5, 1932 |
| 2,118,588 | Butler | May 24, 1938 |
| 2,131,361 | Anderson | Sept. 27, 1938 |
| 2,234,241 | Fuller | Mar. 11, 1941 |
| 2,255,623 | Landsiedel | Sept. 9, 1941 |
| 2,261,242 | Fettig | Nov. 4, 1941 |
| 2,280,919 | Landsiedel | Apr. 28, 1942 |
| 2,309,282 | Sundstrand | Jan. 26, 1943 |
| 2,317,284 | Mangusson | Apr. 20, 1943 |
| 2,371,914 | Rauh | Mar. 20, 1945 |
| 2,396,188 | Mehan | Mar. 5, 1946 |
| 2,472,696 | Drake | June 7, 1949 |
| 2,503,800 | Christian | Apr. 11, 1950 |
| 2,550,581 | Mehan | Apr. 24, 1951 |